United States Patent
Pool et al.

[15] 3,667,200
[45] June 6, 1972

[54] FRUIT AND NUT WINDROWER

[72] Inventors: Stuart D. Pool, Wheaton; Harold G. Meitl, Clarendon Hills, both of Ill.

[73] Assignee: International Harvester Company, Chicago, Ill.

[22] Filed: Aug. 7, 1970

[21] Appl. No.: 61,963

[52] U.S. Cl. ............................56/328 R, 56/10.4, 56/11.9, 56/15.5, 56/16.2
[51] Int. Cl. ..........................................................A01g 19/00
[58] Field of Search ............56/10.4, 11.9, 13.6, 13.7, 56/15.5, 15.9, 16.1, 16.2, 192, 328 R

[56] References Cited

UNITED STATES PATENTS

| | | | |
|---|---|---|---|
| 3,181,619 | 5/1965 | Smith et al. | 56/15.5 X |
| 2,916,868 | 12/1959 | Ramacher et al. | 56/328 R |
| 2,854,808 | 10/1958 | Ramacher et al. | 56/328 R |
| 2,901,879 | 9/1959 | Jones | 56/328 R |
| 2,974,469 | 3/1961 | Smith et al. | 56/13.6 |
| 2,594,776 | 4/1952 | Hiatt | 56/328 R X |

FOREIGN PATENTS OR APPLICATIONS

| | | | |
|---|---|---|---|
| 1,366,210 | 12/1964 | France | 56/13.7 |

*Primary Examiner*—Robert Peshock
*Assistant Examiner*—J. A. Oliff
*Attorney*—Floyd B. Harman

[57] ABSTRACT

A fruit and nut windrower adapted for coupling behind a tractor and including an auger conveyor for gathering fruit or nuts on the ground and disposing the same into a windrow for subsequent pick-up. The conveyor is mounted for shifting movement laterally of the path of travel of the windrower in response to encountering ground obstructions. Means are provided for raising the conveyor from the ground to a transport position.

1 Claim, 2 Drawing Figures

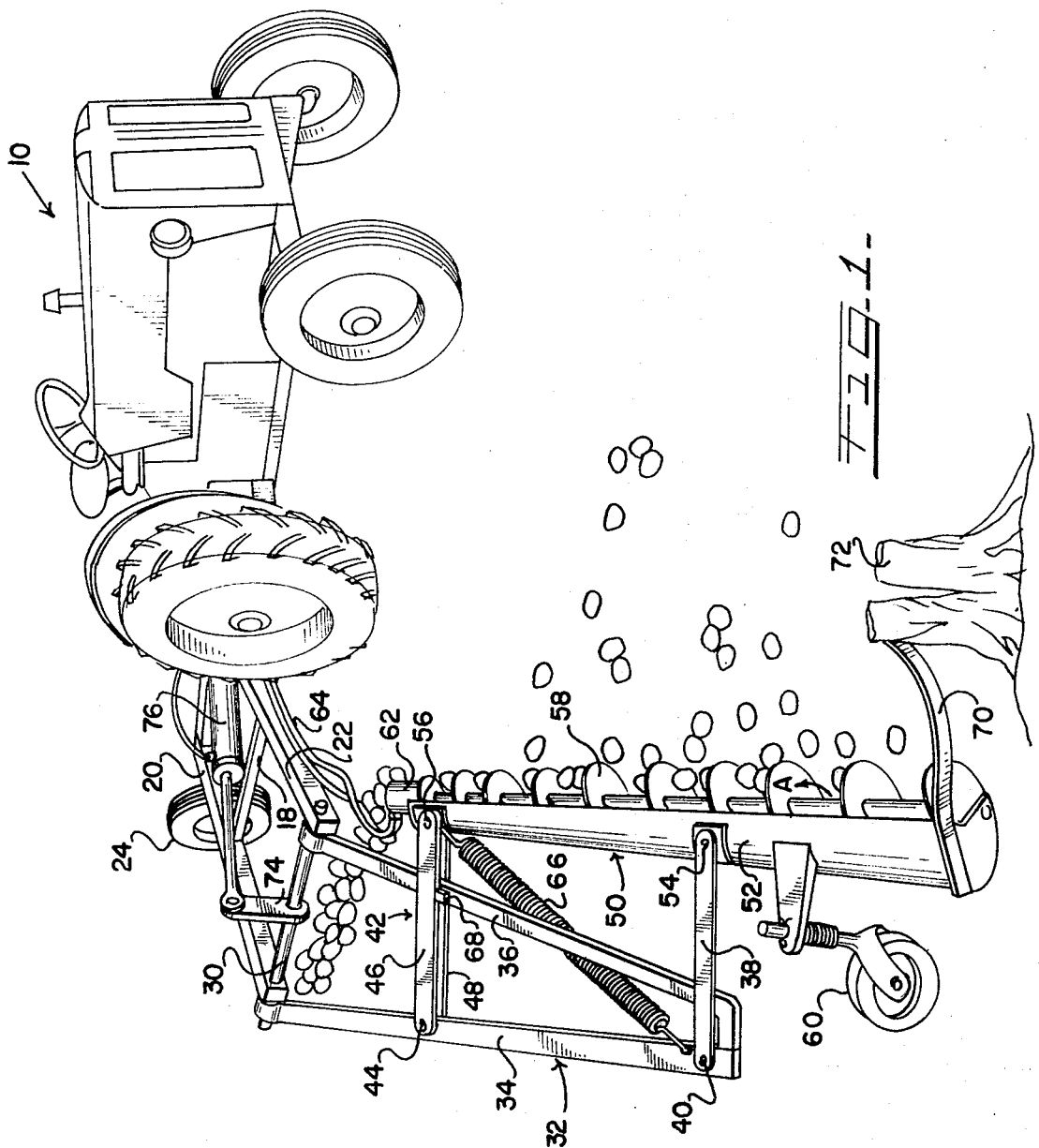

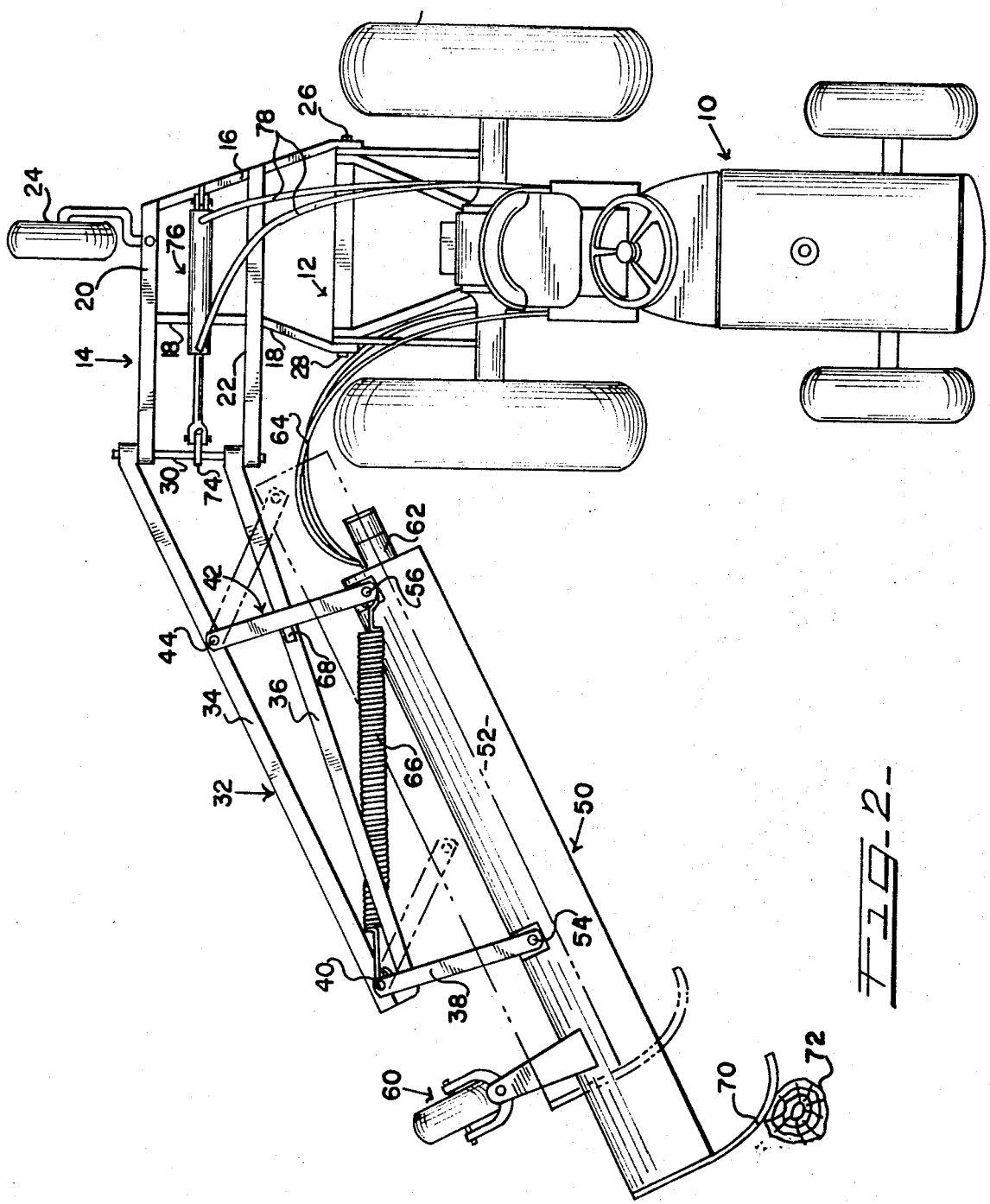

FRUIT AND NUT WINDROWER

BACKGROUND OF THE INVENTION

1. Field of the Invention

The invention relates generally to fruit and nut harvesters and more particularly to a windrower for gathering fruit or nuts on the ground and disposing the same into a windrow for subsequent pick-up.

2. Prior Art

Various machines have been proposed for gathering fruit or nuts on the ground and disposing the same into a windrow for a subsequent harvesting operation. Examples are shown in U.S. Pat. Nos. 2,916,868 and 2,854,808.

Machines of these types are characterized by ease of maneuverability wherein the direction of movement of the entire machine may be changed relatively quickly so that fruit or nuts may be gathered in areas closely adjacent to trees or other ground obstructions. The requirement that the machines be maneuverable in order to function closely adjacent to obstructions can create problems where it is desired to design a machine having relatively large crop-gathering capacity. Designing high capacity machines to be highly maneuverable could well result in an unduly expensive machine both in manufacture and in operation.

SUMMARY

The invention provides a fruit and nut windrower including a support structure adapted for coupling to a prime mover. A ground-engageable, windrow-forming conveyor is mounted on the support structure for shifting movement relative to the support structure in response to engaging ground obstructions. Accordingly, the crop may be gathered in areas closely adjacent to ground obstructions without the necessity that the entire unit be maneuvered relative to the obstructions. The windrower also includes means for raising the conveyor to a transport position to facilitate movement of the windrower between work areas.

It is an object of the invention to provide a fruit and nut windrower having the capability for gathering the crop in areas closely adjacent to ground obstructions.

Another object in conjunction with the foregoing object is to provide a windrower which does not require a high degree of maneuverability as a unit, with the result that the windrower may be relatively simple and inexpensive in construction and operation.

Another object in conjunction with the foregoing objects is to provide a windrower which may be designed to provide for large scale harvesting operations and yet be capable for disposition into a compact unit for transport between work areas.

BRIEF DESCRIPTION OF THE DRAWINGS

FIG. 1 is a perspective view of the windrower of the invention coupled behind a tractor; and, FIG. 2 is a plan view of the windrower of FIG. 1.

DESCRIPTION OF THE PREFERRED EMBODIMENT

As shown in FIGS. 1 and 2 a tractor 10 of the agricultural type may be used as the prime mover for the windrower of the invention. In accordance with conventional practice, the tractor 10 includes a rear hitch assembly 12. Adapted for coupling to the hitch assembly 12 is a generally horizontally disposed frame structure 14. The frame structure 14 includes a pair of longitudinal members 16 and 18 extending rearwardly from the hitch assembly 12. The frame structure also includes a pair of laterally extending members 20 and 22 rigidly secured to the longitudinal frame members 16 and 18. The frame structure 14 is supported by a caster wheel assembly 24 pivotally connected to the rearmost lateral member 20. The frame members 16 and 18 are connected to the hitch assembly 12 by pivot connections 26 and 28 whereby the entire frame structure 14 may pivot about the pivot connections 26 and 28 as the structure is moved over the ground.

A rockshaft 30 is journaled in the ends of the frame members 20 and 22 to define a pivot axis extending generally parallel to the direction of movement of the windrower.

The windrower includes a subframe shown generally at 32 extending laterally and forwardly from the rockshaft 30. The subframe 32 consists of a rear member 34 and a forward member 36 rigidly interconnected at their outer ends. The inner ends of the members 34 and 36 are rigidly secured to the rockshaft 30 to thus define a rigid substantially coplanar structure pivotable about the axis of the rockshaft 30.

A link member 38 is pivotally connected at 40 to the frame member 34 and extends generally forwardly therefrom across the top surface of the frame member 36. A second link structure 42 is pivotally connected at 44 to the frame member 34. The link structure 42 preferably consists of a pair of bars 46 and 48 disposed on opposite sides of the frame member 36 so as to straddle the same as best shown in FIG. 1. It will be seen that the link member 38 and the link structure 42 are disposed in generally parallel relation for pivoting movement in the plane defined generally by the longitudinal extent of the frame member 36.

An elongated conveyor shown generally at 50 is adapted for coupling to the above described link structure. The conveyor 50 includes a semi-cylindrical housing 52 extending the length of the conveyor. The housing 52 is connected to the forward ends of the link structures 38 and 42 by pivot connections 54 and 56, respectively. An auger 58 is journaled in the ends of the housing 54 and extends along the length thereof for purposes to be described. A caster wheel assembly 60 is secured to the housing 52 of the conveyor to provide ground support for that portion of the structure which is pivotable about the axis of the rockshaft 30.

The auger 58 is rotated by a rotary type hydraulic motor 62 secured to an end of the housing 52 as shown. The motor 62 is provided with hydraulic fluid through the hydraulic lines 64 from a suitable source of pressure fluid associated with the tractor 10.

An elongated coil spring 66 is connected between the frame member 34 and the pivot connection 56 of the conveyor 50. The spring 66 normally urges the conveyor outwardly or laterally away from the tractor 10. A suitable stop member 68 is mounted on the frame member 36 against which the bar 46 abuts. Consequently, it will be seen that the stop member 68 establishes the limit to which the spring 66 can shift the conveyor 50 to a position extended away from the tractor 10.

A deflector member 70 is secured to the outer end of the conveyor housing 52 and extends forwardly and laterally inwardly in a curved path from the end of the conveyor. The deflector 70 is arranged to engage ground obstructions such as a tree trunk shown at 72 for shifting the conveyor 50 laterally inwardly as the windrower is moved forwardly during a harvesting operation.

Means are provided for raising the conveyor to a substantially vertical position facilitating transport of the unit. As best shown in FIG. 1, an arm 74 is rigidly secured to the rockshaft 30 and extends generally upwardly therefrom intermediate the ends of the shaft 30. A double-acting hydraulic cylinder unit 76 is pivotally connected between the upper end of the arm 74 and the frame member 16. Hydraulic fluid is supplied to the cylinder unit 76 from the source of pressure fluid in the tractor 10 by means of the fluid lines 78.

In operation the cylinder unit 76 is actuated to lower the subframe 32 and conveyor 50 to a position wherein the structure is supported on the ground by the caster wheel assembly 60. The rotary motor 62 is actuated to rotate the auger 58 in the direction of arrow A of FIG. 1 wherein the helical flighting of the auger operates to convey the fruit or nuts on the ground along the length of the auger inwardly toward the tractor 10. As the unit moves forwardly the crop will be disposed in a windrow as shown in FIG. 1. In the event that the deflector 70 should encounter a ground obstruction such as the tree trunk 72, it will be apparent with reference to FIG. 2 that the conveyor 50 will be shifted inwardly by means of the above described link structure so that the conveyor may clear the obstruction. The inward shifting movement of the conveyor is opposed by the force of the spring 66 which then acts to return the conveyor 50 to its extended position once the conveyor has cleared the obstruction. The extent of shifting movement of the conveyor 50 is shown with reference to the solid line and dotted line positions in FIG. 2. Upon completion of a windrowing operation, the cylinder unit 76 is actuated to raise the subframe 32 and conveyor 50 upwardly about the axis of the rockshaft 30.

From the foregoing, it will be seen that the invention provides a relatively simple and inexpensive machine for gathering and windrowing fruit or nuts on the ground for a subsequent harvesting operation.

What is claimed is:

1. A fruit and nut windrower adapted for coupling to a prime mover to gather fruit and nuts on the ground and dispose the same into a windrow, the combination comprising:
   a frame structure adapted for coupling to the prime mover;
   a subframe mounted on said frame structure;
   a ground-engageable conveyor coupled to said subframe and disposed laterally to the forward direction of travel of the prime mover for engaging fruit and nuts on the ground and conveying the same toward an end thereof to form a windrow, said conveyor being coupled to said subframe by means including a pair of generally horizontally extending link structures pivotally connected to said subframe and extending forwardly therefrom into pivotal connection with said conveyor, said conveyor being disposed forwardly of said subframe and shiftable along the ground between a first position extended away from said frame structure and a second position retracted toward said frame structure, said link structure being arranged to maintain said conveyor in parallelism in said first and second positions;
   deflector means on said conveyor engageable with ground obstructions to shift said conveyor toward said second position to permit said conveyor to clear the obstructions;
   spring means operative between said subframe and said conveyor for shifting said conveyor toward said first position after said conveyor has cleared the obstructions; and
   stop means operative between said subframe and said link structures for positively limiting the movement of said conveyor toward its first position.

* * * * *